United States Patent [19]

Greenberg

[11] Patent Number: 4,805,020

[45] Date of Patent: Feb. 14, 1989

[54] TELEVISION PROGRAM TRANSMISSION VERIFICATION METHOD AND APPARATUS

[76] Inventor: Burton L. Greenberg, 28 E. 10th St., New York, N.Y. 10003

[21] Appl. No.: 10,974

[22] PCT Filed: Oct. 14, 1985

[86] PCT No.: PCT/US85/01996

§ 371 Date: Feb. 3, 1987

§ 102(e) Date: Feb. 3, 1987

[87] PCT Pub. No.: WO86/06239

PCT Pub. Date: Oct. 23, 1986

Related U.S. Application Data

[63] Continuation-in-part of Ser. No. 476,915, Mar. 21, 1983, Pat. No. 4,547,804, and Ser. No. 723,325, Apr. 15, 1985, abandoned.

[51] Int. Cl.[4] .......................... H04N 7/087; H04N 7/08
[52] U.S. Cl. .................................... 358/147; 358/142; 358/84; 455/67
[58] Field of Search .................... 358/84, 86, 142, 147; 455/2, 67

[56] References Cited

U.S. PATENT DOCUMENTS 4,025,851  5/1977  Haselwood et al. .................. 358/84
4,230,990  10/1980  Lert, Jr. et al. ........................ 358/84
4,547,804  10/1985  Greenberg ........................... 358/142
4,639,779  1/1987  Greenberg ........................... 358/142

Primary Examiner—James J. Groody
Assistant Examiner—Michael D. Parker
Attorney, Agent, or Firm—Kevin McMahon

[57] ABSTRACT

A method and apparatus for verifying the proper airing of television programs having a digital identification code recorded on a preselected scan line which is not normally visible to the television viewer. A plurality of television channels are automatically simultaneously monitored by a primary monitoring system at a site 30 within the reception area and broadcast encoded programs are identified and timed and appraised as to their audio and video signal quality. The information generated is stored locally for later comparison with centrally stored 62 information specifying the programs that should have been aired. Each of the channels is sequentially monitored for a preselected fixed time interval, which depends on the number of channels being monitored, under the control of a programmable sequential controller 54. A secondary monitoring system is provided for use as a backup or for monitoring cable channels. Means 74 responsive to a code recorded in the program signal are provided for locally recording the final portion of the program.

11 Claims, 3 Drawing Sheets

TELEVISION PROGRAM TRANSMISSION VERIFICATION METHOD AND APPARATUS

This application is a continuation-in-part of a U.S. patent application Ser. No. 06/476,915, now U.S. Pat. No. 4,547,804 filed Mar. 21, 1983 and U.S. patent application Ser. No. 06/723,325, filed Apr. 15, 1985, now abandoned.

BACKGROUND OF THE INVENTION

1. Field of Invention

This invention relates generally to an improved method and apparatus for automatically identifying and verifying television broadcast programs.

Television broadcast programs are comprised essentially of first run or syndicated feature programs and commercials. Such broadcast programs are either performed live or prerecorded for airing at certain times for specific stations. Commercials normally consist of a 15 second to 1 minute program which is inserted at various times during the viewing day by the broadcasting station according to contracts made with the commercial owner or advertising agency. This is referred to as buying television time spots and the broadcast of the commercial in the purchased time spot is referred to as a "bought airing". Pursuant to a contract, the television station agrees to insert the commercial program in certain time periods specified in contract. From time to time, the television station then bills the buyer of the time spot for having aired the commercial.

The practice over many years has been that a statement is made by the television station under oath to the effect that the commercials were aired at the times bought and that said airing was within the terms contracted. Upon receipt of the sworn statement and the bill, those documents are compared manually, and if they match the commercial time spot is paid for.

However, not all commercials are aired properly and/or at the proper time. This occurs for many different reasons at each of the stations. Therefore, it has become a practice to audit these airings by visual observation. Such auditing is very time consuming, labor intensive and expensive so that only samplings are done for auditing purposes. Such sample auditing is normally carried out by employees of independent contractors, who record what they see on the television and return the records to their employer for collation and reporting. Sample auditing of this type is unreliable for a number of reasons including the fact that it is not always easy to identify a particular commercial or to differentiate it from similar ones.

A further characteristic of the current practice is that because auditing is not automated, there is a significant time delay in reporting and collating the audits. This delay impedes the advertiser from taking timely action to have problems corrected. Thus the advertiser may be unable to forestall repeated improper airings of a commercial.

In addition, this delay in reporting and collating delays the forwarding of the sworn statements on which payment for the advertising time depends.

While the above discussion is directed to the identification and verification of commercials, similar problems exist for other type of programing, such as syndicated programs which are distributed to broadcast stations with commercials already incorporated.

Thus, there has been a long-felt need for a quick, total verification of television broadcast programs, which would serve to upgrade the performance of the transmitting stations and confirm the program airing schedules. This need was addressed in co-pending applications Ser. Nos. 06/479,915 and 06/723,325 over which the teachings of this invention form a improvement.

DESCRIPTION OF THE PRIOR ART

Attempts at automatic program airing verification are known in the art. Methods have been developed for automatic identification systems of programs, including identification coding and pattern recognition, but these methods are substantially limited and have not been entirely satisfactory.

Program identification coding methods have been divided into two general areas, audio and video encoding. Audio encoding (e.g., U.S. Pat. No. 3,845,391 Crosby) has proven to be unsatisfactory for television broadcasting. In the final report of the Ad Hoc committee On Television Broadcast Ancillary Signals Of The Joint Committee on Intersociety Coordination (published May, 1978), the Journal of the Society of Motion Picture and Television Engineers found the aforementioned audio program identification to be unreliable and to cause significant degradation of program signal quality.

Previously proposed systems of video encoding have also been unsatisfactory for verifying the broadcast of television commercials. In U.S. Pat. No. 4,025,851 to Haselwood et al. for network clearance monitoring, a 48 bit digital code is placed onto the vertical blanking interval (VBI) on line 20. While the use of line 20 eliminated the degradation of the program signal quality experienced with audio encoding, the encoding system used therein is overly complex and inadequate for monitoring commercials. This system utilizes a change line format for the handling of the data, which requires complex data processing and verification. In addition, the system is only able to monitor the broadcast of a single network and is unable to scan more than one channel. Moreover, only a method and system for the identification of the program is disclosed with there being no teaching as to the recording of information concerning the program's audio and visual quality. An additional significant problem with the use of lines within the VBI interval, such as line 20, is that the networks insist on maintaining control over all lines in the VBI. They generally refuse to permit the broadcast of commercials with encoded data in the VBI and erase any such data before broadcasting.

SUMMARY OF THE INVENTION

Accordingly, one object of the present invention is to provide a novel and improved method and apparatus for automatic television broadcast program identification and verification or a plurality of channels which combines maximum sampling capability with fault tolerance.

Another object is to provide a novel and improved method and apparatus for automatic television broadcast program identification and verification that minimizes the amount of data processing required.

A still further object is to provide a novel and improved method and apparatus for automatic television broadcast program identification and verification which does not use the VBI.

In accordance with these and other objects of the present invention, there is provided an improved method and apparatus for automatically identifying and verifying the proper transmission of bought airings of television programs having unique identification codes recorded in a predetermined line in the overscan region the active video portion of the video information signal which line is not visible to the person viewing the program. The programs are transmitted at various times over a plurality of channels for reception within a geographical area referred generally to as a market area. The transmitted composite signals are monitored by a primary monitoring system at a location within the market area and cyclically scanned at a predetermined repetition rate with each channel being sampled for a preselected time interval within each scanning cycle to detect the presence of an identification code on the line of the video information signal. The preselected time interval is determined as a function of the number of channels being monitored and the repetition rate. The identification codes are separated from the composite signals and the color burst and the audio and video signal quality are measured for each frame of all programs which include an identification code. Verified airings information for the programs having identification codes recorded therein are generated and stored at the monitoring station. The verified airings information includes for each transmission of each program information specifying: the identification code, the time, the duration, the channel, and audio, video, and color burst quality for each of the verified airings. From time to time, a central computer polls the local monitoring station and causes it to transmit the verified airings information to the central computer for comparison with bought airings information stored in the central computer.

A secondary monitoring system is provided for generating additional data about the transmittal composite signals to be combined with that generated by the primary system to generate the verified airings information; alternatively, the secondary monitoring system is used to monitor cable channels.

In accordance with a further aspect of the invention, when the programs or commercials incorporated as part of a syndicated program, the data recorded on the predetermined line further includes a code identifying the particular program and means are provided for incorporating the program identification information as part of the verified airings information.

For locally tagged commercials which identify local sources of nationally advertised goods at the end of the commercial, the final portion of the commercial is recorded locally at the monitoring station for verification and billing purposes.

BRIEF DESCRIPTION OF THE DRAWINGS

These and other objects and features of the invention will become apparent with reference to the following specification and to the drawings wherein.

DETAILED SPECIFICATION

Figure 1:
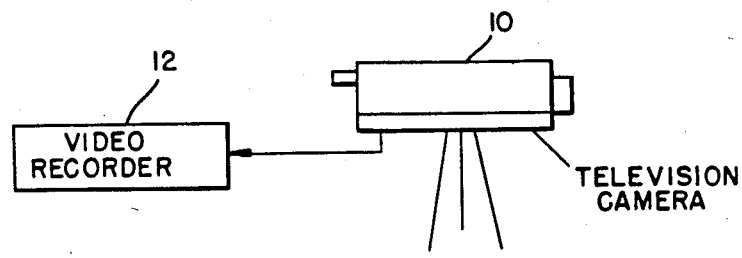
FIG. 1 is a block diagram of a video recording arrangement utilized in practicing the invention.

Referring now to FIG. 1, a video camera 10 is shown for generating a video signal having an informational content. The informational content comprises program matter such as a feature, commercial or other form of information which is to be transmitted by a television station in a market area to a receiving station in the area. The camera 10 includes means for generating a composite signal having a video information component and scanning control components. The latter include horizontal and vertical synchronizing signal components and horizontal and vertical beam blanking components. The latter components, as is well-known, blank the electron beam in a cathode-ray tube at the receiving station during the retrace interval, or VBI, of the scanning electron beam. In accordance with the NTSC signal, the composite signal is transmitted at a rate as specified by RS-170 and RS-170A for black and white and color broadcasts respectively. In foreign countries, Phase Alternating Line (PAL) or Sequential Color with Memory (SECAM) may be used. At the completion of each field, the beam is blanked by a vertical blanking signal and the beam retraces to restart a subsequent field. The composite video signal is coupled from the video camera 10 to a video recorder 12. The video information content of the program can thus be recorded on magnetic tape by the recorder 12, if so desired.

Figure 2:
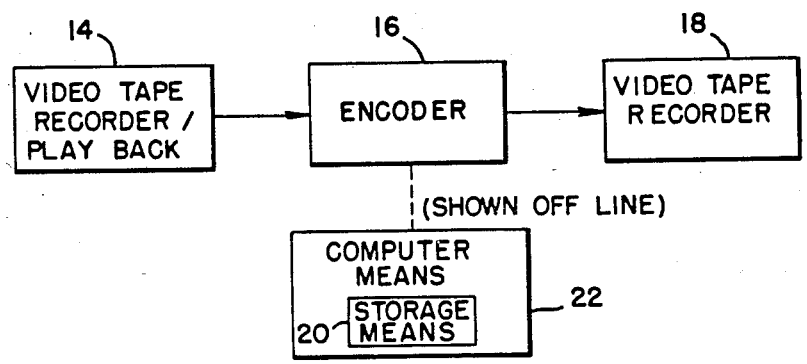
FIG. 2 is a block diagram of an arrangement for generating and combining an identification signal with a video signal.

The video program if recorded, is copied at a dubbing studio. A number of copies of the program are made depending on the determined distribution requirements for the particular program. As illustrated in FIG. 2, the recorded program comprises a master tape which is loaded on a standard video tape playback apparatus 14 (commercially available from Ampex, Sony or RCA). The video signal which is read from the tape by this machine is coupled via an encoder 16 to a video tape recorder 18. The encoder 16 inserts a multibit identification code in the video portion of line 22 of each of fields 1 and 2. Line 22 is the first full line in the active video area which normally would contain picture information. Use of this line is advantageous because it avoids the use of the VBI thus obviating some of the objections of the television networks. Almost all television receivers overscan the screen, and the first line of video information that is actually visible is about line 30. Therefore, the use of a line, such as 22, in the overscan region of the active video has the further advantage of not causing any degradation of the picture seen by the television viewer.

In one specific embodiment, the identification code is an eight character alphanumeric digital ISCI code. In the preferred embodiment of the invention, the information recorded on line 22 includes 9 bits of phase and code reference information which designates the line as containing an identification code. These re followed by the 8 alphanumeric characters ISCI identification code that uniquely identifies the commercial or program. Each character is encoded as an 8 bit byte one bit of which is not used. Ninth and tenth 8 bit characters are provided which are used in identifying local advertisers named at the end of a commercial and /or the name of the program in the case of commercials included in a syndicated TV program.

In some commercials the name and addresses of local sources of a nationally advertized product are given at the end of a commercial. In such cases the ninth character is a particular code that indicates that the commercial includes such a local tag, and the tenth character indicates the length of the commercial. This information is used in the manner to be described hereafter to turn on a VCR to record the last 10 to 15 seconds of the commercial to record the local advertizer identification information for later verification and billing purposes.

Syndicated TV programs with some commercials already included are marketed to various local stations in different market areas and are broadcast at different times. In order to distinguish between advertisements transmitted as part of a syndicated program from a local spot inserted by the local station, a two-character syndicated program identification code is recorded in the ninth and tenth character code locations of line 22. This information is decoded in the manner to be described hereinafter to identify the program containing the commercial.

Following the ninth and tenth characters an eleventh character space is provided for an 8 bit cyclical redundancy check code used for error detection purposes.

The composite signal applied to the video recording apparatus 16 therefore includes an identification signal which identifies the video information. This identification code is also supplied to the storage means 20 of a central computer 22. The computer 22 also stores additional information referenced to the identification code, such as the name of the client on whose behalf the program is prepared, the name of the purchasers of the bought airings, and the date, time spot and direction of the bought airing.

Copies of the commercials thus recorded are supplied to various television stations around the country for transmission in particular market areas. Different commercials, each having a unique identification code are supplied to television stations in a market area and are transmitted at various times over different communication channels for reception in the market area.

While the method of the above encoding has been described using prerecorded television broadcast programs, it is also possible to encode the signal for live broadcasts. In such an arrangement the signal from the television camera 10 would be supplied directly to the identification signal generator 16 for encoding, and would then be transmitted directly with or without taping.

Figure 3:
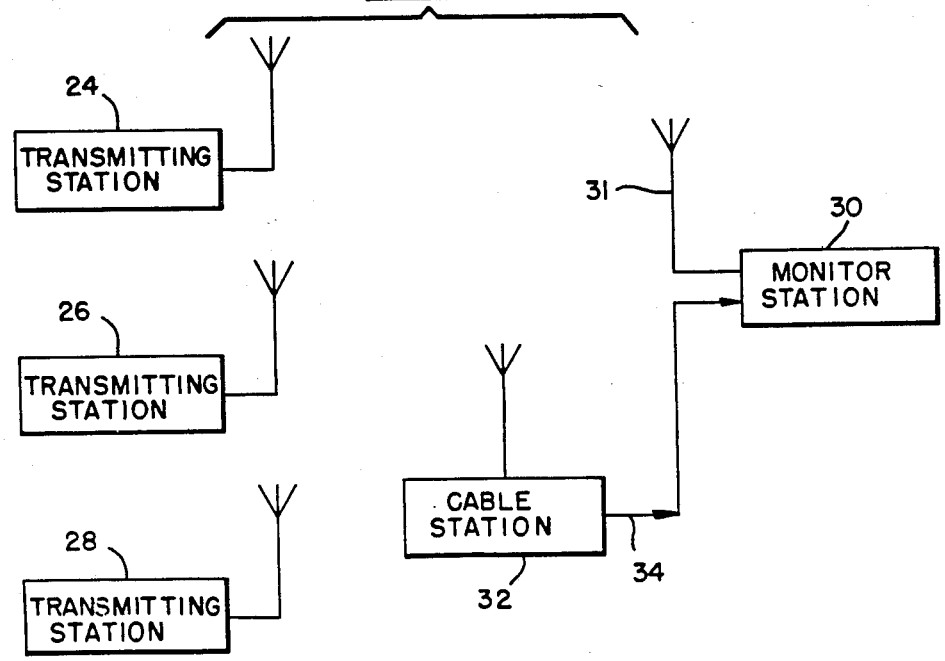
FIG. 3 is a diagram, partly in block form, of a receiving station in accordance with the invention.

FIG. 3, illustrates three television sending stations 24, 26, and 28 which service a market area. Composite signals modulate RF carrier signals and are broadcast by the stations 24, 26, and 28. A monitoring receiving station 30 in the market area receives the different signals from the stations 24, 26, and 28. A cable T.V. station 32 also receives the signals from stations 24, 26, and 28 by broadcast or by satellite communication. The signals received by cable station 32 are amplified and transmitted over a cable transmission line 34 to the monitor station 30 as well as to other receiving stations in the market area. For purposes of this specification and the appended claims, the term "transmit" refers both to broadcasting and to transmission of composite signals over transmission lines such as the cable 34.

Figure 4:
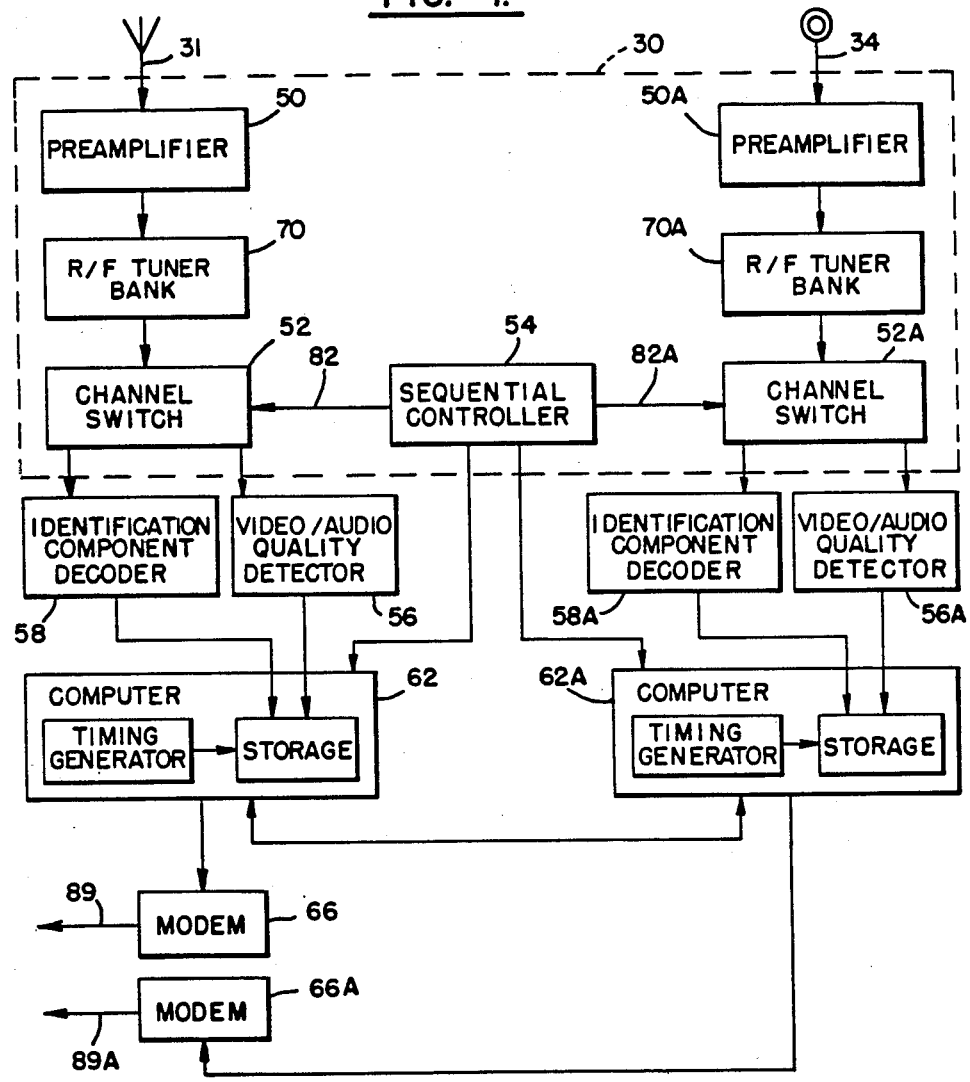
FIG. 4 is a diagram, partly in clock form, of a receiving station in accordance with the invention.

As illustrated on the left hand side of FIG. 4, a broadcast signal which is received by the antenna 31 of the monitor receiver station 30 is coupled by a preamplifier 50 to an RF tuner bank 70 each of which is set to a different one of the channels being broadcast. The video channel switch 52 shown in the example of FIG. 4 switches sequentially among the tuners. For example, switch 52 could be set to switch sequentially among tuners set to channels 2, 4, 5, 7, 9, and 11 in the metropolitan New York City, New York area. Depending on the market being serviced, tuner bank 70 and switch 52 can switch among more or fewer channels as required. A suitable channel switch is available commercially from Channelmatic Inc., of Alpine, Calif. The channel switch 52 switches sequentially among tuners of the tuner bank 70 at a rate for scanning each channel for a preselected fixed time interval chosen as a function of the number of channels being monitored over a predetermined time period.

According to the preferred embodiment of the invention, the predetermined time period is chosen as one second, and the fixed time interval is determined by dividing the number of channels being monitored into one second. Different criteria may be established for selecting an appropriate predetermined time period, depending, for example, on the frame rate being received, the number of channels being monitored, etc. If six stations are being monitored and 30 frames per second are received at receiver station 30, the fixed time interval is 1/6 second, which corresponds to the time over which 5 frames containing 10 fields are received. Although 5 frames are received over the fixed time interval, something fewer than 5 frames are processed in search of the identifying code since the switch 52 is not necessarily synchronized with the received signal and the first and last fields may not be complete.

Switching to the next channel in sequence after the expiration of each fixed time interval is controlled by sequential controller 54. Controller 54 may be realized by a special purpose switching circuit or by a simple, off the shelf, programmable general purpose digital computer having a clock and a first register for receiving as an input the number of channels to be monitored. A second register may then receive a number equal to the number of clock pulses generated by the computer in one second, divided by the contents of the first register, i.e. the number of channels being monitored. The result is that the number stored in the second register represents the number of clock pulses that must be counted before generating a signal to switch 52 to cause sequential switching. In effect, the number stored in the second register represents the fixed time interval for scanning a particular channel for the identity code. After signaling the end of the fixed time interval and signaling switch 52 to switch sequentially to the next channel, controller 54 is then automatically reset to count through the fixed time interval once again.

Finally sequential controller 54 also outputs a signal identifying which channel is being monitored at a given moment. This may be realized by simply incrementing a register by one each time channel switching occurs and outputting a signal indicative of the stored number. This register could, for example, be reset each time the number stored equals the number of channels being monitored which was previously indicated as stated in controller 54.

Turning back to the processing of the received signals at station 30, as the composite video signal for each channel is presented to decoder 58, line 22 is examined for the presence of the source identification code.

The composite signal and the associated audio signal are coupled from switch 52 to a video/audio quality detector 56 for sensing the level of the DC component of the signals and for generating an output signal indicative of video and audio quality. A presence detector of this type is commercially available from Channelmatic Inc., of Alpine, Calif. The detector 56 also detects the presence of the color burst.

If an identification code on line 22 of a field is detected by the decoder 58, the identification code, the channel identification, and an indication as to the quality of the color burst and the video and audio signals along with the time and date of reception are stored in the memory of a local computer means 62 as a verification signal. Thus there is stored by the computer 62 for each field received for which a identification code is detected by decoder 58.

The assembly of the verification signals is accomplished for each full frame within the preselected fixed time interval, which, if 6 channels are being monitored as in the example set out hereinbefore, is 1/6 second. If a different number of channels are being monitored, the preselected fixed time interval would be longer or shorter so long as it is long enough to include at least one full field. In cases when the commercial is being transmitted as part of a syndicated program, the two character program identification code may be recorded in the ninth and tenth character location on line 22. In such a case those two characters are also stored in the memory of the computer 62 as part of the verification signal.

At the end of each fixed time interval, controller 54 automatically causes switch 52 to switch to the next tuner in sequence, restarting the identification process. The process is repeated for all the selected channels until it returns to the first monitored channel to start the identification process over at the beginning of the next cycle.

The right hand side of FIG. 4 depicts a secondary system for monitoring a cable input. A pre-amplifier 50A, R/F tuner bank 70A, channel switch 52A, identification component detector 58A, video/audio quality detector 56A, and computer 62A, are all substantially identical to the broadcast monitoring system just described. The channel switch 52A is under the control of sequential controller 54 which also supplies the channel information to the computer 62A.

The secondary monitoring system is normally used for monitoring cable channels which may be the same or different as the broadcast channels being monitored by the primary system shown on the left hand side of FIG. 4. If no cable channels are available at the monitoring station, the secondary system may advantageously be used as a backup system, monitoring the same broadcast channels as the primary system. This has the significant advantages of providing fault tolerant operation if the primary system should sustain a fault and of increasing the sampling rate by a factor of 2 when both systems are working.

When operating in the backup mode, the cable pickup 34 would be replaced by a broadcast signal receiving antenna.

According to the preferred embodiment of the invention, if sequential controller 54 is, for example, sequencing through the New York channels in the sequence, channel 2, 4, 5, 7, 9, and 11, the backup path would sequence through the channels in the order 7, 9, 11, 2, 4, and 5. This allows the sampling of twice the number of frames per channel during each cycle thereby increasing verification accuracy. It is preferred that the order of sampling in the secondary system be as close as possible to 180° out of phase with that of the primary system so that successive samples of each channel are evenly spaced in time.

Because a verification signal is generated and stored in the memories of computers 62 and 62A for each field detected with a identification code, a great deal of data builds up in a short time. In order to compress the data to conserve memory space and to transform the verified airings data into a more usable format, the computers 62 and 62A periodically (preferably once per hour) process the verification signals data. First the verification signals are processed to identify "valid segments" which normally should correspond to the reception of a commercial on a channel. A valid segment continues for so long as no more than one second passes between successive decodings of the same ISCI identification code on line 22 of a channel. If a commercial on one channel ends while the system is scanning another channel, the system becomes aware of it only when the first channel is scanned again on the next cycle. Thus, there can be up to something less than one second of uncertainty in the duration of a commercial depending on the number of channels being monitored. In deciding the duration of the commercial, the system assumes that the commercial lasts until the first field sensed that does not have an identification code recorded on line 22.

For each valid segment, the identification code, starting time, duration, channel switch position, and duration of valid audio, video, and color burst signals are recorded in another portion of the memory of the computers 62 and 62A as verified airings information. If the two character program identification code is also stored as part of the verification signal, the code is aleso recorded as part of the verified airings information.

If the secondary system is operating in a redundant mode the verification signal stored in its memory are also transmitted to the computer 62 before each data compression sequence and are interleaved with the primary systems verification signals in the memory of computer 62. Thus the verified airings information generated in the memory of computer 62 is based on twice the number of samples as the verified airings information in computer 62A. If the secondary system is monitoring cable channels, the primary and secondary systems may contain different verified airings information. In the preferred embodiment of the invention, the verified airing information in the secondary computer 62A is transmitted to the primary computer 62 to simplify the polling of the monitoring station as will be explained more fully below.

Figure 5:
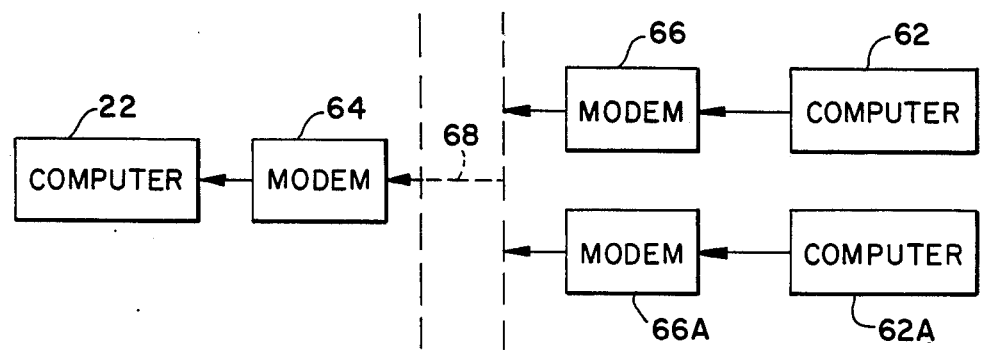
FIG. 5 is a block diagram of an arrangement for comparing a verification and reference signal.

FIG. 5 illustrates communication between the central computer 22 and computers 62 and 62A. Each of these computers is coupled via modems 64, 66, and 66A to a telephone transmission line 68. Periodically, preferably on a daily basis, the central computer 22 sends an inquiry signal to computer 62 via modem 66 which causes the computer 62 to transmit the verified airings information stored in its memory to the central computer 22 along with status information concerning the remote station 30. The verified airings information includes the data collected by the secondary system either in the form of cable channel verified airings information previously transmitted from computer 62A to computer 62 if the secondary system is monitoring cable channels, or, of verified airings information based on twice the number of samples if the secondary system is operating in the backup mode. If the primary system is not operating properly, the central computer 22 polls the secondary computer 62A through modem 66A. In this case either cable channel verified airings information or broadcast channel verified airings is transmitted to the central computer 22 depending on whether the secondary system is monitoring cable channels or acting as a backup respectively. In the second case no data is lost when the secondary system is operating in the backup mode since both the primary and secondary computers would normally be storing the same verified airings information.

The central computer 22 compares the verified airings information from the computer 62 or 62A with the stored bought airing reference signals thus verifying the transmission and quality of the transmitted signals. Bought airing reference signals stored in the central compute 22 for which no verified airing information is received are indicated not having been transmitted, so that appropriate follow-up action can be taken.

Only one monitoring station covering a single market area has been illustrated in FIGS. 3 and 4. The central computer 22 normally sequentially querys receiving stations in a number of different market areas, and thus centrally correlates information for the transmission of programs throughout the country.

Figure 6:
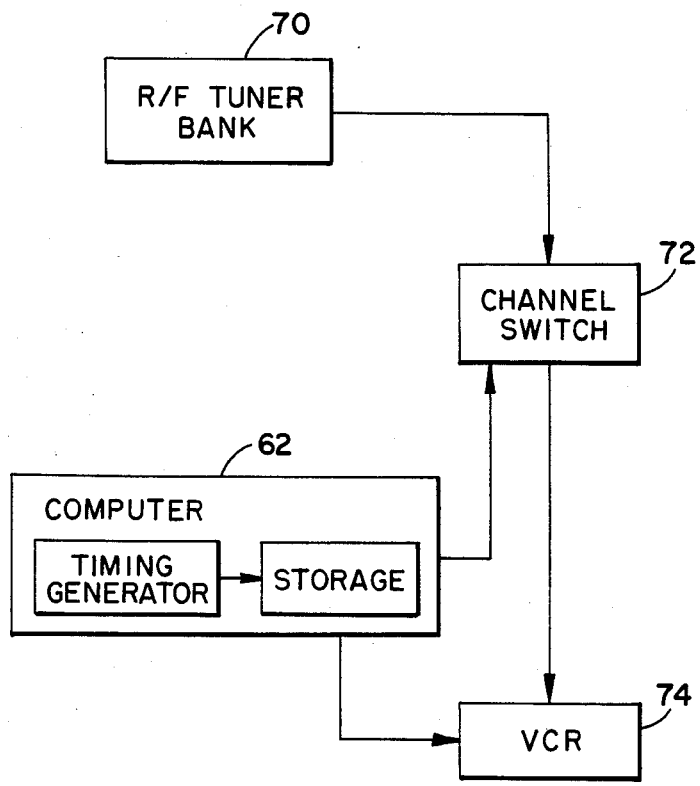
FIG. 6 is a block diagram of an arrangement for storing the last portion of locally tagged commercials on a VCR.

Referring now to FIG. 6 of the drawings, if the commercial includes a locally tagged commercial identification code in the ninth character position on line 22, the computer 22 commands a second channel switch 72 to switch to the channel transmitting the locally tagged commercial. The tenth character on line 22 in such a case specifies the duration of the commercial.

At the proper time the computer 62 commands the VCR 74 to turn on to record the last 10 to 15 seconds of the commercial. At the end of the 10 to 15 seconds the computer 62 commands the VCR to turn off again. the VCR therefore stores in sequence the last 10 to 15 seconds of all locally tagged commercials monitored by the system in the market area. In conjunction with the verified airings information stored in the computer 62 this information identifies the local advertisers whose names and addresses are appended at the end of commercials for verification and billing purposes.

The channel switch 72 may be separate or may be included as part of the VCR 74.

The method and apparatus thus described are advantageous in that comprehensive auditing of transmitted television commercials is automatically accomplished. The automatic auditing is accomplished economically and rapidly thus enabling prompt follow-up on faulty or incorrect transmissions and enhancing the billing and payment for aired time.

What is claimed is:

1. In a method for automatically idnetifying and verifying the proper transmission of bought airings of television programs having a composite signal including a video information signal each having a unique identification code recorded in a preselected line of the video information signal which programs are transmitted at various times over a plurality of channels for reception within a geographical area, the improvement comprising the steps of:
   (a) receiving the composite signals of said plurality of channels;
   (b) periodically scanning said channels at a predetermined repetition rate with each channel being sampled for a preselected time interval in each period to detect the presence of one of said identification codes, said time interval being determined as a function of the number of channels being monitored and the length of said period;
   (c) separating each of said identification codes from the composite signals received on said channels;
   (d) detecting the color burst and audio quality for the composite signals including an identification code;
   (e) generating a time signal and a channel identification signal;
   (f) forming and storing verified airings information for each transmission of each of said programs including information specifying the identification code, time, duration, channel, and color burst and audio quality of said program.

2. The improvement of claim 1 further including the steps of:
   (a) storing in a central memory bought airings reference signals, each of said reference signals including information Concerning the time spot, channel and duration of a bought airing of a program referenced to the corresponding identification code for such program; and
   (b) comparing said stored verified airings information with the bought airings information in said central memory.

3. The improvement of claim 1 wherein said line of the video information signal is a line within the overscan region of the active video portion of the video information signal.

4. The improvement of claim 1 wherein said television programs are commercials and further including the steps of:
   (a) detecting the presence of an additional code on said preselected line in conjunction with one of said identification codes said additional code identifying the program in which the commercial identified by said code is transmitted; and
   (b) storing as part of said verified airings information an identification of the program in which said commercial is included.

5. In a system for automatically identifying and verifying the proper transmission of bought airings of television programs having composite signals including a video information signal each having a unique identification code recorded in a selected line of each frame of the video information, said programs being transmitted at various times over different channels for reception in a geographical area, improved apparatus comprising:
   (a) means for receiving the composite signals of the programs on the different channels;
   (b) means for cyclically sequentially scanning said channels at a predetermined repetition rate each channel being sampled for a preselected time interval during each cycle the duration of said interval being determined as a function of the number of channels being scanned and the repetition rate;
   (c) means for detecting the presence of an identification code on the selected line in each frame of a program and for reading said identification code;
   (d) means for generating a time signal and a channel identifying signal; airings
   (e) means for forming and storing verified airings information for each airing of one of said programs including information specifying the identification code, time, duration and channel;

(f) central memory means for storing bought airing information for said programs referred to the corresponding identification code to identify the channel, time and duration of each of said brought airings; and (g) means for comparing said bought airings information with said verified airings information to verify the broadcast of said programs.

6. The improved apparatus according to claim 5 wherein said selected line of said video information is in the overscan region of the active video portion of the video information signal.

7. The improved apparatus according to claim 5 further including means for detecting the color burst and audio and video quality of said composite signals of said programs, said verified airings information further including data on the color burst and audio and video quality of said programs.

8. In a system for automatically identifying and verifying the proper transmission of composite signals including video information signals of television programs each having a unique identification code recorded as a part of the video information signal, said programs being transmitted at various times over different channels for reception in a geographical area, improved apparatus comprising:

(a) central processing means for storing reference signals including information specifying each transmission of said programs each of said reference signals being referenced to the corresponding identification code;

(b) first and second means for monitoring said different channels each of said monitoring means including;

(i) means for detecting the presence of one of said unique identification codes in the video information signal of said programs;

(ii) means for forming and storing verified airings information for each airing of a program having one of said unique identification codes recorded in the video information signal thereof including information specifying the identification code, time, duration, and channel of said airing; and (iii) means for enabling said central processing means to receive from said first monitoring means verified airings information based on detection of identification codes by said first and second monitoring means.

9. The improved apparatus of claim 8 wherein said identification code is recorded on a preselected line of each frame of said video information signal and wherein said first and second monitoring means each further include:

(a) means for receiving the composite signals present on a plurality of said different channels; and (b) means for cylically scanning said plurality of channels at a predetermined repetition rate each channel being sampled for a preselected time interval during each cycle, the duration of said interval being determined as a function of the number of channels being scanned.

10. In a local monitoring system for automatically identifying the proper transmission of bought airings of television commercials having a composite signal including a video information signal and each having a unique identification code recorded in a selected line of the video information signal, said programs being transmitted over one or more channels for reception in a geographical area, the improvement comprising:

(a) means for receiving the composite signals transmitted on said plurality of channels;

(b) means for detecting the presence of an identification code on said selected line of said video information signal of a received commercial;

(c) means responsive to the presence of an additional code in the video information signal of a received commercial for locally recording the final portion of the commercial in which said additional code is recorded.

11. The local monitoring system of claim 10 wherein said additional code includes information specifying the length of said commercial and wherein said detecting means includes means responsive to said length specifying information for controlling said recording means to record only a preselected final portion of said commercial.

* * * * *